Figure 1:
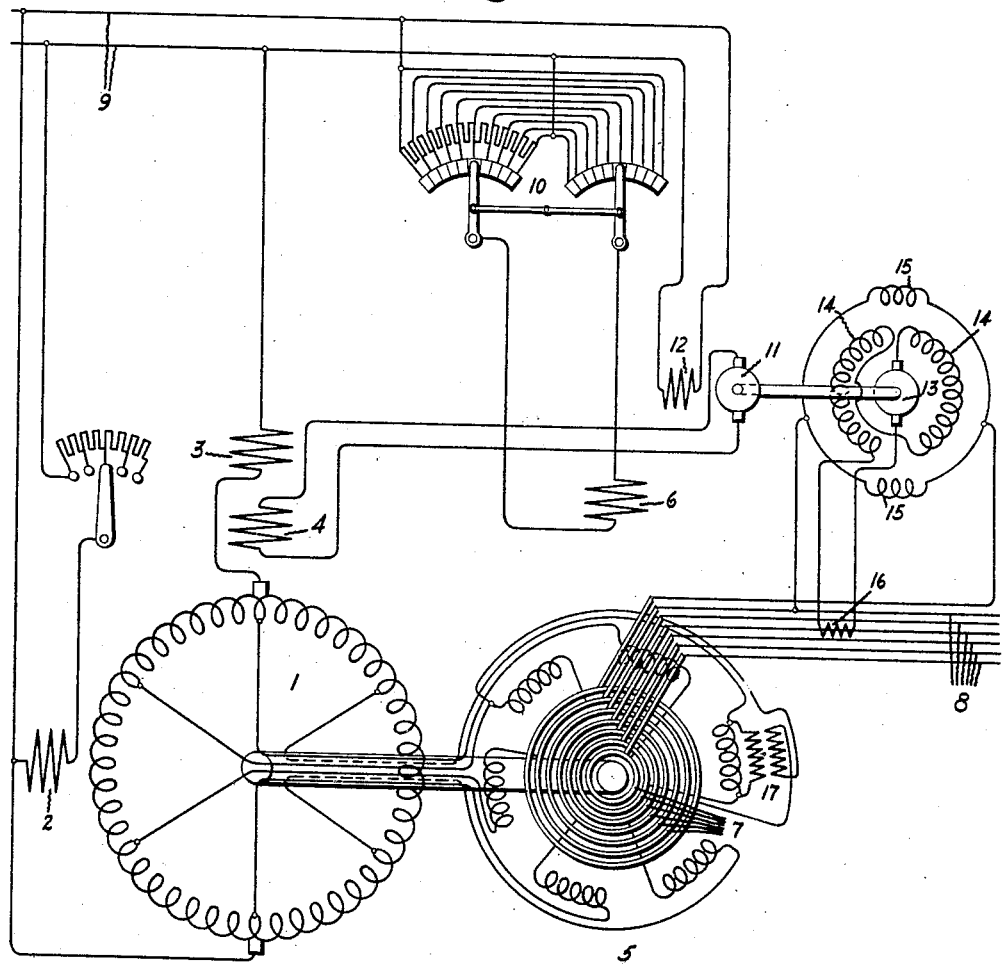

W. C. KORTHALS-ALTES.
ROTARY CONVERTER.
APPLICATION FILED NOV. 6, 1917.

1,263,436.

Patented Apr. 23, 1918.
3 SHEETS—SHEET 1.

Inventor:
Willem C. Korthals-Altes,
by
His Attorney.

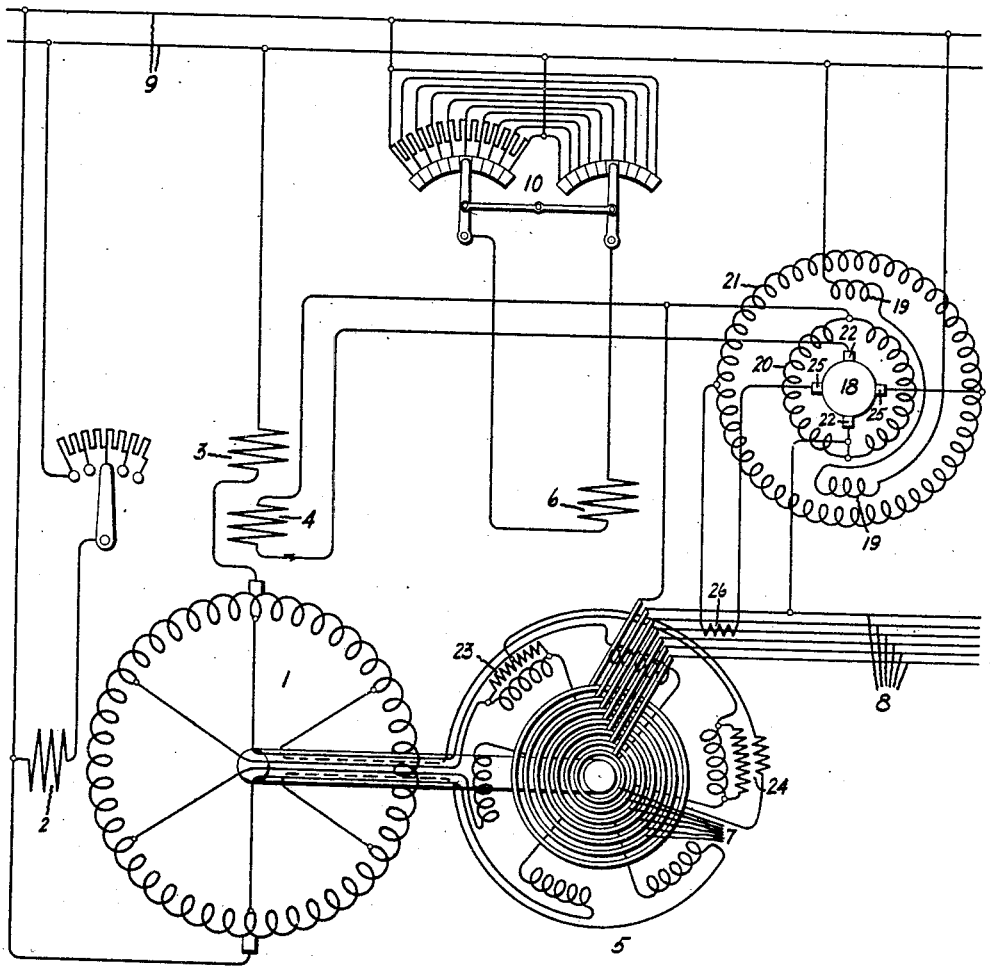

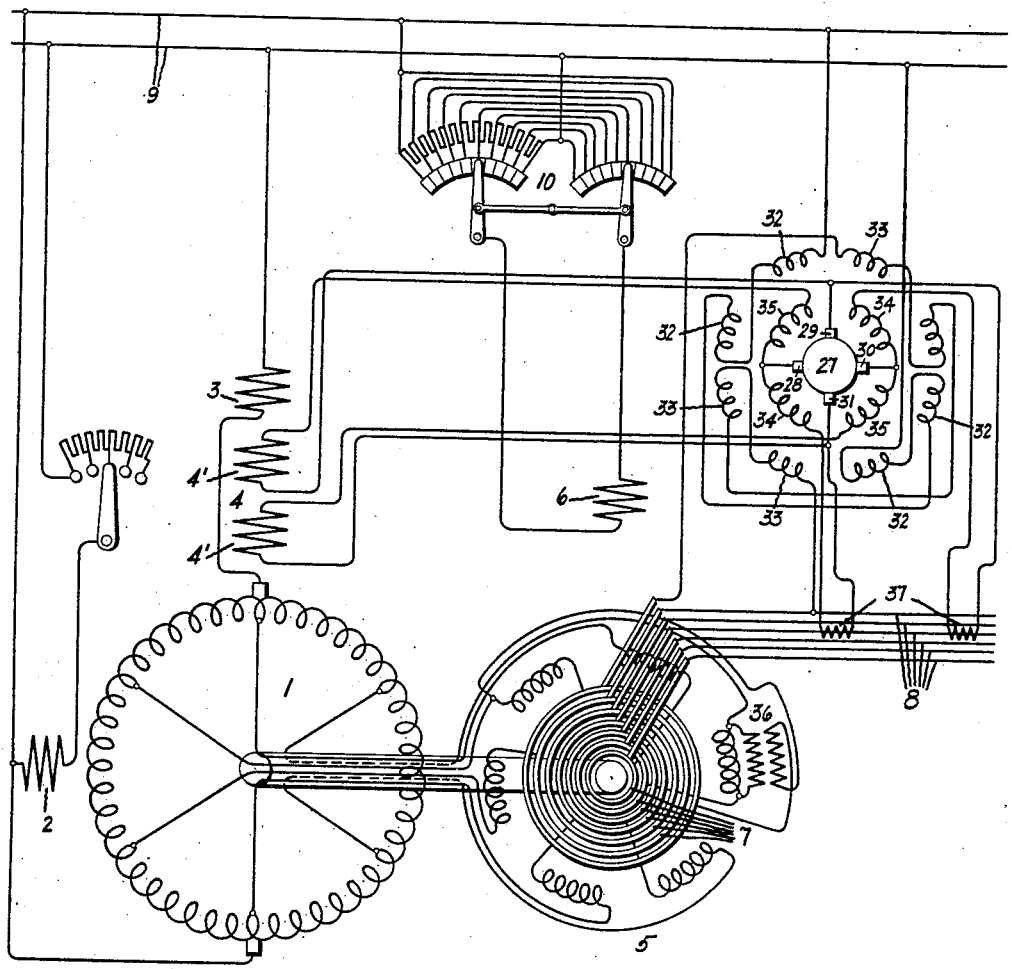

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

ROTARY CONVERTER.

1,263,436.  Specification of Letters Patent.  Patented Apr. 23, 1918.

Application filed November 6, 1917. Serial No. 200,610.

*To all whom it may concern:*

Be it known that I, WILLEM C. KORTHALS-ALTES, a subject of the Queen of the Netherlands, residing at Schenectady, county of Schenectady, State of New York, have invented certain new and useful Improvements in Rotary Converters, of which the following is a specification.

My invention relates to rotary converters and particularly to rotary converters provided with commutating poles and operated in connection with variable voltage boosters mechanically connected thereto. When a booster is mechanically connected to a rotary converter it impresses a motor load on the converter when boosting and a generator load on the converter when bucking; or in other words, when the booster is boosting the voltage of the converter, it must be driven as a generator by the converter but when operating to buck the converter voltage the booster operates as a motor transmitting mechanical energy to the converter. Under such conditions, the effective armature reaction of the rotary converter varies through wide limits and directly affects the magnetization of the commutating poles. The armature reaction caused by the booster when boosting the converter voltage is in a direction to add to the excitation of the commutating poles of the converter, whereas under the bucking condition the armature reaction caused by the booster is in a direction to subtract from the excitation of the commutating poles of the converter.

My invention has for its object the provision of a novel and simple arrangement by which the strength of the commutating field may be adjusted to the correct value under all conditions of load and buck and boost.

In accordance with one aspect of my invention, I provide the commutating poles of the rotary converter with two windings, one of which is excited in accordance with the direct current load on the rotary converter and the other of which is excited with direct current from a rotary transformer having a winding connected across two phases of the booster and another winding connected so as to be supplied with current proportional to the current of another phase of the booster. By connecting the rotary transformer in this way, the currents in its windings will be substantially in phase when the rotary converter is operating at unity power factor and consequently the current supplied the auxiliary commutating field winding will be proportional to the motor or generator load of the booster on the converter, when the converter is operating at any power factor, as will be explained in detail hereinafter.

In another aspect, my invention consists in the combination of a novel single armature rotary transformer with a booster type commutating pole rotary converter, which will be hereinafter more fully described and claimed.

For a better understanding of my invention reference may be had to the following description taken in connection with the accompanying drawings, in which Figure 1, shows diagrammatically one embodiment of my invention; and Figs. 2 and 3 show diagrammatically other embodiments of my invention in which single armature rotary transformers are employed.

In all of the figures of the drawings, I have shown a polyphase rotary converter 1 having a main exciting winding 2, a commutating field winding 3 energized in accordance with the direct current load on the converter and an auxiliary commutating field winding 4, which is shown in Fig. 3 as divided into a plurality of equal parts $4^1$, $4^1$. The converter 1 is mechanically connected to a variable voltage, polyphase booster 5 having a field winding 6. The booster is shown as being of the synchronous type connected through collector rings 7 to alternating current mains 8 and having its alternating current windings connected to the armature winding of the converter. The armature of the converter 1 is connected to direct current mains 9, to which is also connected the booster field winding 6 through a double dial rheostat 10. The strength of the booster field and consequently the voltage of the booster may be varied over a wide range and reversed by means of the double dial rheostat 10.

A rotary transformer for transforming from alternating current to direct current has its direct current end connected to the auxiliary commutating field winding 4 of the converter and its alternating current end provided with a field winding connected across two phases of the booster and an armature winding connected so as to be supplied with current proportional to the current of another phase of the booster. By thus connecting the field and armature windings of the rotary transformer, the currents in these windings will be substantially in phase when the rotary converter is operating at unity power factor, because the field winding circuit is highly inductive and the armature winding circuit is substantially non-inductive. In view of this, the field flux and the armature current will be in phase when the converter is operating at unity power factor and the torque produced by the rotary transformer, acting as a motor, and consequently its speed will be substantially proportional to the product of the vector sum of the voltage of two of the phases of the booster by the current in another phase of the booster at unity power factor, and at a power factor other than unity will be substantially proportional to the product of the vector sum of the voltage of two of the phases of the booster by the current in another phase of the booster by the power factor. Since this product, whether operating at unity power factor or at some power factor other than unity, is proportional to the motor or generator load of the booster on the converter, the torque of the rotary transformer will be proportional to the load of the booster and its direction of rotation will depend upon whether the load of the booster on the converter is a generator or motor load. The voltage generated by the direct current end of the rotary transformer is directly proportional to the motor torque thereof and consequently directly proportional to the load of the booster, and the direction of the direct current voltage of the rotary transformer will depend on the direction of rotation of the rotary transformer. Since the auxiliary commutating field winding 4 is connected to the direct current end of the rotary transformer, the strength of the field produced by this winding will vary with the load of the booster on the converter and its direction will depend upon whether the load is a motor or generator load. As is well known, the commutating field of the converter must also be varied in accordance with the direct current load on the converter as well as in accordance with the motor or generator load of the booster and such additional excitation of the commutating poles is provided by the series commutating field winding 3, the effect of which is either additive or subtractive to that of the auxiliary commutating field winding, depending on whether the booster is bucking or boosting.

In each of the figures of the drawings I have shown a different type of rotary transformer, the field and armature windings of which are connected as described above.

Referring to Fig. 1, the rotary transformer comprises a direct current generator having an armature 11 and a direct current field winding 12, and an alternating current commutator motor direct connected to the generator and having an armature 13, a compensating winding 14 and a field winding 15. The armature 11 of the generator is connected to the auxiliary commutating field winding 4 of the converter and its field winding 12 is connected to the direct current mains 9, which supply it with excitation which is near enough constant for practical operation. The armature 13 and the compensating winding 14 of the alternating current motor are connected in series across a current transformer 16 in one phase of the booster, so as to supply current thereto proportional to the current in this phase of the booster. The field winding 15 of the motor is connected across two other phases of the booster by means of connections across one phase of the booster in series with the secondary of a transformer 17 connected across another phase of the booster, which, in the six phase machine illustrated, is displaced 120 electrical degrees from the other phase. The booster phase in which the current transformer 16 is placed, is located 120 electrical degrees from the phases across which the field winding 15 is connected. As already explained, the armature 13 is connected to the current transformer 16, and therefore in view of the above described connections of the field winding 15 and the armature 13, the voltages applied to these windings differ in phase by substantially 90 electrical degrees, with the booster and rotary operating at unity power factor. In view of the high reactance of the field winding 15 and the low reactance of the armature winding 13, the currents in these two circuits however, will be in phase, with the converter operating at unity power factor. With the rotary transformer connected as described in connection with Fig. 1, the strength of the field produced by the auxiliary commutating field winding will vary with the load of the booster on the converter under all conditions and its direction will depend upon whether the load is a motor or generator load.

In Fig. 2, the rotary transformer comprises a single armature 18 provided with a commutator and a field member provided with a direct current field winding 19, an alternating current field winding 20 which also acts as a direct current compensating winding, and an alternating current compensating winding 21. The field winding 19 is connected to the direct current mains 9, and is supplied with substantially constant excitation therefrom. The commutator, through the sets of brushes 22, is connected so as to supply direct current to the field winding 20 and the auxiliary commutating field winding 4 of the converter in series, whereby the winding 20 acts as a direct current compensating winding. The field winding 20 is also connected across two phases of the booster by means of connections to a compensator 23 connected across one phase, in series with the secondary of a transformer 24 connected across another phase, displaced 120 electrical degrees from the first. The commutator, through the sets of brushes 25, and the alternating compensating winding 21 are connected in series across a current transformer 26 in another phase of the booster, displaced 120 electrical degrees from the phases across which the field winding 20 is connected. As explained above, the alternating current field produced by the field winding 20 will be in phase with the alternating current in the armature 18 of the rotary transformer with the booster and converter operating at unity power factor. The rotary transformer illustrated has four sets of brushes per pair of poles. The armature winding of the rotary transformer is a full pitch winding but all of the windings 19, 20 and 21 on the field member may be wound with a 50 per cent. pitch, which makes it possible to build such a rotary transformer with a small number of poles, say, two or four.

From the diagram of Fig. 2 and the connection of the alternating and direct current compensating field windings 20 and 21, it will be seen that the rotary transformer is compensated for both direct and alternating current, and it will therefore be impossible to induce by static induction any voltage between the terminals of the rotary transformer connected to the auxiliary commutating field winding and furthermore no alternating current voltage will be induced in the direct current field winding 19 when an alternating current flows from the current transformer 26 through the alternating current compensating winding 21 and the armature 18. By means of the exciting or field windings, voltages may be induced in the armature between the sets of brushes by its rotation. The excitation produced by the alternating current field winding 20 will produce a rotation alternating current voltage between the sets of brushes 25 and the direct current field winding 19 will also produce a rotation direct current voltage between the sets of brushes 22. These two field windings are in space quadrature and are for this reason in non-inductive relation to each other, so that there will not be any interference between the direct current and alternating current flowing in the various circuits connected to the rotary transformers.

As stated above, the winding 20 serves as a direct current compensating winding and also as an alternating current field winding. With this arrangement, there are no definite neutral points for commutation and it will be advantageous to cut away certain of the teeth of the field member, under which the brushes are standing, in order to obtain good commutation. If however the direct current compensating winding and the alternating current field winding are separate windings in the rotary transformer of Fig. 2, then it will be possible to obtain four definite neutral points per pair of poles under which the brushes may stand for perfect commutation, without cutting away any teeth of the field member. Such a rotary transformer connected as described above, in connection with Fig. 2, will develop a torque proportional to the load of the booster on the converter and its direction of rotation will depend upon whether the load is a motor or generator load, and the direct current voltage generated between the sets of brushes 22 will be proportional to the motor torque of the rotary transformer and the direction of this voltage will depend on the direction of rotation of the rotary transformer. Since the auxiliary commutating field winding 4 of the converter is connected to the brushes 22 of the rotary transformer, the strength of the field produced by this winding will vary with the load of the booster on the converter and its direction will depend upon whether the load is a generator or motor load.

In Fig. 3, the rotary transformer comprises a single armature 27 provided with a commutator on which bear four sets of brushes 28, 29, 30 and 31 per pair of poles, and a field member provided with a direct current field winding 32, an alternating field winding 33, an alternating compensating winding 34 and a direct current compensating winding 35.

The direct current field winding 32 is connected to the direct current mains and is supplied with substantially constant excitation therefrom. The alternating current field winding 33 is connected across two phases of the booster, by means of connections across one phase of the booster in series with the secondary of a transformer 36 connected across another phase of the booster, displaced 120 electrical degrees from the other phase. Current transformers 37 are provided in another phase of the booster, displaced 120 electrical degrees from the phases across which the field winding 33 is connected. These current transformers may be replaced by a single transformer having two secondary windings. One of these transformers 37 supplies alternating current to one half the alternating compensating winding 34 connected in series with the armature through the sets of brushes 28 and 31, and the other of these transformers 37 supplies alternating current to the other half of the alternating current compensating winding 34 connected in series with the armature through the sets of brushes 29 and 30. The armature is connected through the sets of brushes 28 and 29 so as to supply direct current to one half of the direct current compensating winding 35 in series with one half of the auxiliary commutating field winding 4¹ of the converter, and the armature is also connected through the sets of brushes 30 and 31 so as to supply direct current to the other half of the direct current compensating winding 35 and to the other half of the auxiliary commutating field winding 4¹.

With the connection of the armature 27 and the alternating current field winding 33 to the booster phases as explained above, the alternating current field produced by the field winding 33 will be in phase with the alternating current in the armature 27 with the booster and converter operating at unity power.

From the diagram of Fig. 3 and the connection of the alternating current and direct current compensating field windings 34 and 35, it will be seen that there are four completely compensated circuits on the rotary transformer, two of which are connected to the auxiliary commutating field windings of the converter and the other two of which are connected to the current transformers 37. As these circuits are completely neutralized, it will be impossible to induce by static induction any voltage between the terminals of the rotary transformers connected to the parts 4¹ of the auxiliary commutating field winding, and also no alternating current voltage will be induced in the direct current field winding 32 when alternating current flows from the current transformers 37 through the alternating current compensating windings 34 and the armature 27. By means of the exciting or field windings, voltages may be induced in the armature between the sets of brushes by its rotation. The excitation produced by the alternating current field winding 33 will produce a rotation alternating current voltage between the sets of brushes 28—31, and 29—30, and the direct current field winding 32 will produce such a rotation, direct current voltage between the sets of brushes 28—29, and 30—31. These two field windings 32 and 33 are in space quadrature and are for this reason in non-inductive relation to each other, so that there will not be any interference between the direct current and alternating current flowing in the various circuits connected to the rotary transformer.

Such a rotary transformer as described in connection with Fig. 3 can be built with a full pitch winding on the armature and with full pitch windings on the field member. If desired, it may be supplied with the usual interpole field winding for improving its commutation.

Such a rotary transformer connected as described above in connection with Fig. 3, will develop a torque proportional to the load of the booster on the converter and its direction of rotation will depend upon whether the load is a motor or generator load, and the direct current voltage generated between the sets of brushes 28—29 and 30—31 will be proportional to the motor torque of the rotary transformer and the direction of this voltage will depend on the direction of rotation of the rotary transformer. Since the parts of the auxiliary commutating field winding of the converter are connected to the sets of brushes 28—29 and 30—31 of the rotary transformer, the strength of the field produced by the auxiliary commutating field winding will vary with the load of the booster on the converter and its direction will depend upon whether the load is a motor or generator load.

The single armature rotary transformers illustrated in Figs. 2 and 3 are advantageous from a heating standpoint, as will appear from a consideration of the unusual operating conditions of such rotary transformers in connection with booster type commutating pole rotary converters. Such a converter may operate with a large current output, the booster, however, being unexcited and consequently not generating any voltage. Under such a condition, the rotary transformer is at a standstill, but a large alternating current will flow through the armature and the alternating current compensating winding of the rotary transformer, whereas no direct current will flow in the armature and direct current compensating winding. Since, however, the armature of the rotary transformer is designed to carry a large direct current as well as a large alternating current at full speed, it will carry a large alternating current alone at standstill or a large alternating current and a small direct current at slow speed without its temperature rising unduly, because of the large mass of material and the large amount of cooling surface available for dissipating the heat.

I desire it to be understood that my invention is not limited to the particular arrangements shown and described, and I aim in the appended claims to cover all modifications which do not depart from the spirit and scope of my invention.

What I claim as new and desire to secure by Letters Patent of the United States, is:—

1. In combination, a polyphase rotary converter having a commutating field winding energized in accordance with the direct current load on said converter and an auxiliary commutating field winding, a variable voltage polyphase booster mechanically connected to said rotary converter, and rotary transformer means for transforming from alternating current to direct current, the direct current end of said rotary transformer means being connected to said auxiliary commutating field winding, said rotary transformer means having a winding connected across two of the phases of the booster and another winding connected so as to be supplied with current proportional to the current of another phase of the booster to make the currents in said rotary transformer windings substantially in phase when said rotary converter is operating at unity power factor.

2. In combination, a polyphase rotary converter having a commutating field winding energized in accordance with the direct current load on said converter and an auxiliary commutating field winding, a variable voltage polyphase booster mechanically connected to said rotary converter, and rotary transformer means for transforming from alternating current to direct current, the direct current end of said rotary transformer means being connected to said auxiliary commutating field winding, said rotary transformer means having a field winding connected across two of the phases of the booster and an armature winding connected so as to be supplied with current proportional to the current of another phase of said booster to make the currents in said field and armature windings of said rotary transformer means substantially in phase when said rotary converter is operating at unity power factor.

3. In combination, a polyphase rotary converter having a commutating field winding energized in accordance with the direct current load on said converter and an auxiliary commutating field winding, a variable voltage polyphase booster mechanically connected to said rotary converter, and rotary transformer means for transforming from alternating current to direct current, the direct current end of said rotary transformer means being connected to said auxiliary commutating field winding, said rotary transformer means having a field winding supplied with substantially constant direct current excitation, a winding connected across two of the phases of the booster and another winding connected so as to be supplied with current proportional to the current of another phase of the booster to make the currents in said last mentioned windings of the rotary transformer means substantially in phase when said rotary converter is operating at unity power factor.

4. In combination, a polyphase rotary converter having a commutating field winding energized in accordance with the direct current load on said converter and an auxiliary commutating field winding, a variable voltage polyphase booster mechanically connected to said rotary converter, and rotary transformer means for transforming from alternating current to direct current, the direct current end of said rotary transformer means being connected to said auxiliary commutating field winding, said rotary transformer means having a field winding supplied with substantially constant direct current excitation, a field winding connected across two of the phases of the booster and an armature winding connected so as to be supplied with current proportional to the current of another phase of the booster to make the currents in said field winding connected across two of the phases of the booster and in said armature winding of the rotary transformer means substantially in phase when said rotary converter is operating at unity power factor.

5. In combination, a polyphase rotary converter having a commutating field winding energized in accordance with the direct current load on said converter and an auxiliary commutating field winding, a variable voltage polyphase booster mechanically connected to said rotary converter, and rotary transformer means for transforming from alternating current to direct current, the direct current end of said rotary transformer means being connected to said auxiliary commutating field winding, said rotary transformer means having a field winding connected across two of the phases of the booster, and an armature winding and a compensating winding connected in series so as to be supplied with current proportional to the current of another phase of said booster to make the currents in said field winding and in said armature winding of said transformer means substantially in phase when said rotary converter is operating at unity power factor.

6. In combination, a polyphase rotary converter having a commutating field winding energized in accordance with the direct current load on said converter and an auxiliary commutating field winding, a variable voltage polyphase booster mechanically connected to said rotary converter, and rotary transformer means for transforming from alternating current to direct current, the direct current end of said rotary transformer means being connected to said auxiliary commutating field winding, said rotary transformer means having a field winding supplied with substantially constant direct current excitation, a field winding connected across two of the phases of said booster, and an armature winding and a compensating winding connected in series so as to be supplied with current proportional to the current of another phase of the booster to make the current in said field winding connected across two of the phases of the booster and in said armature winding substantially in phase when said rotary converter is operating at unity power factor.

7. In combination, a rotary converter having a commutating field winding energized in accordance with the direct current load on said converter and an auxiliary commutating field winding, a variable voltage booster mechanically connected to said rotary converter and a rotary transformer for transforming from alternating current to direct current comprising a single armature provided with a commutator, and a field member provided with a direct current field winding, an alternating current field winding and a compensating winding, connections from said commutator to said auxiliary commutating field winding of the converter for supplying direct current thereto, and other connections to said commutator and to said compensating winding so as to supply to said commutator and said compensating winding, a current proportional to the current of the booster, said alternating current field winding being connected so as to be supplied with current proportional to the voltage of the booster, said direct current field winding being supplied with substantially constant direct current excitation.

8. In combination, a polyphase rotary converter having a commutating field winding energized in accordance with the direct current load on said converter and an auxiliary commutating field winding, a variable voltage polyphase booster mechanically connected to said rotary converter, and a rotary transformer for transforming from alternating current to direct current comprising a single armature provided with a commutator, and a field member provided with a direct current field winding, an alternating current field winding and a compensating winding, connections from said commutator to said auxiliary commutating field winding of the converter for supplying direct current to said rotary converter, and other connections to said commutator and to said compensating winding so as to supply to said commutator and to said compensating winding a current proportional to the current of one phase of the booster, said alternating current field winding being connected across two other of the phases of the booster to make the alternating currents in said alternating current field winding and in said armature of the rotary transformer substantially in phase when said rotary converter is operating at unity power factor, said direct current field winding being supplied with substantially constant direct current excitation.

9. In combination, a rotary converter having a commutating field winding energized in accordance with the direct current load on said converter and an auxiliary commutating field winding, a variable voltage booster mechanically connected to said rotary converter, and a rotary transformer for transforming from alternating current to direct current comprising a single armature provided with a commutator, and a field member provided with a direct current field winding, a direct current compensating winding, an alternating current field winding and an alternating current compensating winding, connections from said commutator to said direct current compensating winding and to said auxiliary commutating field winding of the converter for supplying direct current thereto, and other connections to said commutator and to said alternating current compensating winding so as to supply to said commutator and said alternating current compensating winding a current proportional to the current of the booster, said alternating current field winding being connected so as to be supplied with current proportional to the voltage of the booster, said direct current field winding being supplied with substantially constant direct current excitation.

10. In combination, a polyphase rotary converter having a commutating field winding energized in accordance with the direct current load on said converter and an auxiliary commutating field winding, a variable voltage polyphase booster mechanically connected to said rotary converter, and a rotary transformer for transforming from alternating current to direct current comprising a single armature provided with a commutator, and a field member provided with a direct current field winding, a direct current compensating winding, an alternating current compensating winding, connections from said commutator to said direct current compensating winding and to said auxiliary commutating field winding of the converter for supplying direct current thereto, and other connections to said commutator and to said alternating current compensating winding so as to supply to said commutator and said alternating current compensating winding a current proportional to the current of one phase of the booster, said alternating current field winding being connected across two other of the phases of the booster to make the alternating current in said alternating current field winding and in said armature of the rotary transformer substantially in phase when said rotary converter is operating at unity power factor, said direct current field winding being supplied with substantially constant direct current excitation.

11. In combination, a rotary converter having a commutating field winding energized in accordance with the direct current load on said converter and an auxiliary commutating field winding divided into a plurality of equal parts, a variable voltage booster mechanically connected to said rotary converter, and a rotary transformer for transforming from alternating current to direct current comprising a single armature provided with a commutator and a field member provided with a direct current field winding, a direct current compensating winding divided into a plurality of equal parts, an alternating current field winding and an alternating current compensating winding divided into a plurality of equal parts, connections from said commutator to each of the parts of said direct current compensating winding and to each of the parts of said auxiliary commutating field winding of the converter for supplying direct current thereto, and other connections to said commutator and to each of the parts of the alternating current compensating winding so as to supply to said commutator and each of the parts of the alternating current compensating winding a current proportional to the current of the booster, said alternating current field winding being connected so as to be supplied with current proportional to the current of the booster, said direct current field winding being supplied with substantially constant direct current excitation.

12. In combination, a polyphase rotary converter having a commutating field winding energized in accordance with the direct current load on said converter and an auxiliary commutating field winding divided into a plurality of equal parts, a variable voltage polyphase booster mechanically connected to said rotary converter, and a rotary transformer for transforming from alternating current to direct current comprising a single armature provided with a commutator, and a field member provided with a direct current field winding, a direct current compensating winding divided into a plurality of equal parts, an alternating current field winding and an alternating current compensating winding divided into a plurality of equal parts, connections from said commutator to each of the parts of said direct current compensating winding and to each of the parts of said auxiliary commutating field winding of the converter for supplying direct current thereto, and other connections to said commutator and to each of the parts of the alternating current compensating winding so as to supply to said commutator and each of the parts of the alternating current compensating winding a current proportional to the current of one of the phases of the booster, said alternating current field winding being connected across two other of the phases of the booster to make the alternating current in said alternating current field winding and in said armature of the rotary transformer substantially in phase when said rotary converter is operating at unity power factor, said direct current field winding being supplied with substantially constant direct current excitation.

In witness whereof, I have hereunto set my hand this 3rd day of November, 1917.

WILLEM C. KORTHALS-ALTES.

Copies of this patent may be obtained for five cents each, by addressing the "Commissioner of Patents, Washington, D. C."